UNITED STATES PATENT OFFICE.

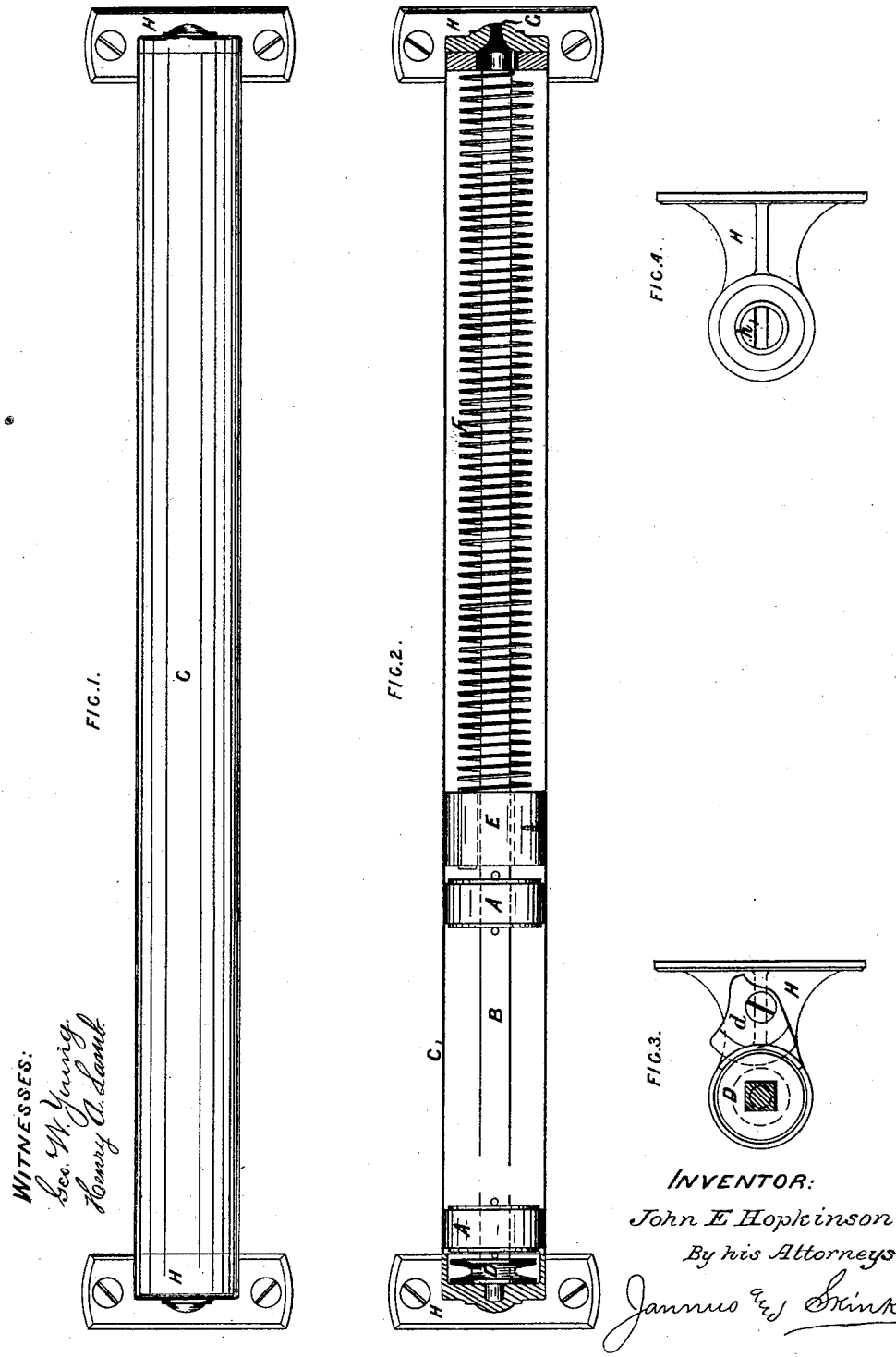

JOHN EBENEZER HOPKINSON, OF LONDON, COUNTY OF MIDDLESEX, ENGLAND.

CURTAIN-ROLLER.

SPECIFICATION forming part of Letters Patent No. 346,045, dated July 20, 1886.

Application filed May 26, 1885. Serial No. 166,767. (No model.) Patented in England March 14, 1885, No. 3,333, and April 21, 1885, No. 4,937; in France May 11, 1885, No. 168,839; in Belgium May 12, 1885, No. 68,843, and in Italy December 31, 1885, No. 19,219.

*To all whom it may concern:*

Be it known that I, JOHN EBENEZER HOPKINSON, a subject of the Queen of England, residing at London, in the county of Middlesex, and Kingdon of England, have invented new and useful Improvements in the Construction of Rollers and Apparatus for Raising and Lowering Window-Blinds, (for which I am applying for Letters Patent for Great Britain, No. 4,937, bearing date April 21, 1885,) of which the following is a specification.

My invention relates to improvements in the construction of rollers, and apparatus for raising and lowering window-shades, particularly applicable to the blinds of railway-carriage windows, but which may also be applied to blinds of other description; and the objects of my improvements are to facilitate the raising and lowering of the blind and its retention at any desired point.

My improvement consists in the combination of one or more elastic friction-disks together with a ratchet-wheel or friction-clutch with a hollow roller, the said friction-disks being securely fixed upon an axle within the roller, which axle by virtue of the friction or ratchet wheel can only revolve in one direction.

The mechanical arrangements by which I attain the objects of my invention will be readily understood by reference to the accompanying drawings, upon which—

Figure 1 represents an elevation of my improved roller operated by a spring, Fig. 2 being a longitudinal section through the same. Fig. 3 is an end view of one of the roller-brackets, showing friction-clutch and pawl for locking axle. Fig. 4 is an end view of the opposite bracket with slot for reception of bush.

Similar letters refer to similar parts throughout the several views.

The elastic friction disks or washers A, fixed on the axle B in any suitable manner, are made so as to fit closely the inner surface of the roller C, the opposite end of the axle being provided with a friction-clutch or ratchet-wheel, D, for the purpose of limiting the revolution of the axle and disks to one direction. By this arrangement it will be seen that in pulling down the blind, the lower end of which is weighted, the roller is caused to revolve or slide upon the elastic disks or washers A, these latter, together with the axle, being rigidly held from turning by the action of the friction-pawl *d* engaging with the friction pulley D, which is secured upon the outer end of the axle B. The roller C in turning carries with it the plug E together with the end of the spring F, attached thereto, the other end of this spring being firmly held within the bush G, fitted in the slot *h* of the bracket H. It will be understood that the friction of the disks A against the inside of the roller C will retain the blind at any position to which it is drawn, but that directly the weighted end of the blind is raised the action of the spring F causes the rollers C to revolve in the opposite direction, the friction disks A, together with the axle B and wheel D, being also free to revolve, the blind then winds up until its weighted end is released.

I do not limit myself to any particular number of elastic disks, as these will be regulated by the width of the blind and other considerations.

I am aware that it is not broadly new to use friction devices for securing a curtain-roller in any desired position, and I therefore do not claim such features, broadly, my invention consisting in improvements in the construction thereof.

Having fully described my invention, what I desire to claim and secure by Letters Patent is—

1. In a spring-roller, the combination, with a cylinder, C, of the shaft B passing longitudinally therethrough and carrrying the friction-disks A, acting against the interior walls of the cylinder, and suitably journaled at one end and provided with the ratchet D, and pawl *d*, in proximity to the said journal, of the bush G, extending from the opposite end of the cylinder and forming a stationary end support therefor, and for the other end of the shaft B, substantially as shown and described.

2. In a spring-roller, the combination, with cylinder C, its stationary end support G, a spring, F, secured at one end to said support and at the other to a plug, E, fixed within the casing, of the shaft B, having one of its ends supported within the support G, and passing through the plug E, and carrying the friction-disks A, and provided at its other end with a pawl and ratchet adapted to restrict its rotation and that of the disks to one direction only, and a suitable support or bearing for the other end thereof, substantially as shown and described.

JOHN EBENEZER HOPKINSON.

Witnesses:
VICTOR ISIDORE FEENY,
T. J. OSMAN.